(12) United States Patent
Schoenen et al.

(10) Patent No.: US 9,911,106 B2
(45) Date of Patent: Mar. 6, 2018

(54) SYSTEM AND METHOD FOR CHARGING SERVICES USING EFFECTIVE QUANTA UNITS

(71) Applicant: Huawei Technologies Co., Ltd., Shenzhen (CN)

(72) Inventors: Rainer Schoenen, Ottawa (CA); Halim Yanikomeroglu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 14/141,143

(22) Filed: Dec. 26, 2013

(65) Prior Publication Data
US 2014/0195394 A1    Jul. 10, 2014

Related U.S. Application Data

(60) Provisional application No. 61/749,584, filed on Jan. 7, 2013.

(51) Int. Cl.
*G07F 19/00* (2006.01)
*H04M 15/00* (2006.01)
(Continued)

(52) U.S. Cl.
CPC ......... *G06Q 20/145* (2013.01); *G06Q 20/085* (2013.01); *G06Q 20/127* (2013.01);
(Continued)

(58) Field of Classification Search
CPC ........ G06Q 90/00; G06Q 30/04; G06Q 40/04; G06Q 30/0283; G06F 17/00; G06F 15/16;
(Continued)

(56) References Cited

U.S. PATENT DOCUMENTS 5,204,699 A * 4/1993 Birnbaum .......... G03G 15/0849
                                                    347/130
6,014,633 A * 1/2000 DeBusk ................. G06Q 10/06
                                                    705/7.12
(Continued)

FOREIGN PATENT DOCUMENTS

CN         1765080 A         4/2006
CN         1949815 A         4/2007

OTHER PUBLICATIONS

International Search Report received in PCT/CN2014/070095, dated Apr. 3, 2014, 10 pages.
(Continued)

*Primary Examiner* — Olusegun Goyea
(74) *Attorney, Agent, or Firm* — Slater Matsil, LLP

(57) ABSTRACT

Embodiments are provided for enabling dynamic pricing of services to users. The amount of usage all or different services are quantized into quanta of minimum usage units, such as to an amount of effective bits (eBits) in communications services. The amount of usage of the different services is weighted differently, such as according to service cost or demand, to obtain corresponding amount of quanta of usage or eBits for each service. The amount of quanta of usage or eBits for the different services is summed up to provide a total amount of quanta of usage or eBits. The total amount of quanta of usage or eBits is converted into a total charge, as a product of the total amount of quanta of usage or eBits, or a monotonic function of the total amount, and a fixed charge rate per quanta of usage or eBit.

21 Claims, 4 Drawing Sheets

(51) Int. Cl.
*G06Q 20/14* (2012.01)
*G06Q 20/08* (2012.01)
*G06Q 20/12* (2012.01)
*H04L 12/14* (2006.01)

(52) U.S. Cl.
CPC ...... *H04L 12/1432* (2013.01); *H04L 12/1435* (2013.01); *H04L 12/1485* (2013.01); *H04M 15/58* (2013.01); *H04M 15/61* (2013.01); *H04M 15/80* (2013.01); *H04M 15/81* (2013.01); *H04M 15/43* (2013.01)

(58) Field of Classification Search
CPC ...... G06F 15/11; G06F 15/34; G06F 11/3409; G06F 15/173; G06F 17/30; G06F 1/32; G01D 4/004; H04W 28/18; H04W 52/12; H04W 52/34; H04W 52/26
USPC .......... 705/30, 32, 35, 34, 39, 400; 709/201, 709/224; 340/870.02, 870.11; 707/602; 455/450, 453
See application file for complete search history.

(56) References Cited

U.S. PATENT DOCUMENTS

| | | | | |
|---|---|---|---|---|
| 7,509,646 | B1* | 3/2009 | Maw | G06F 9/505 703/22 |
| 2003/0032433 | A1* | 2/2003 | Daniel | H04W 72/0486 455/452.1 |
| 2003/0171123 | A1* | 9/2003 | Laakso | H04W 28/18 455/453 |
| 2003/0193405 | A1* | 10/2003 | Hunt | G01D 4/004 340/870.02 |
| 2005/0055694 | A1* | 3/2005 | Lee | G06F 9/4881 718/100 |
| 2005/0251804 | A1* | 11/2005 | Musta | G06F 9/542 718/100 |
| 2006/0155555 | A1* | 7/2006 | Barsness | G06Q 20/10 705/39 |
| 2006/0293026 | A1 | 12/2006 | Foll et al. | |
| 2006/0294027 | A1* | 12/2006 | Jain | G06Q 30/0283 705/400 |
| 2008/0133953 | A1* | 6/2008 | Kawaji | G06F 1/3209 713/322 |
| 2008/0319883 | A1* | 12/2008 | Delany | G06Q 30/04 705/32 |
| 2009/0248854 | A1* | 10/2009 | Conway | G06F 1/3203 709/224 |
| 2011/0167034 | A1* | 7/2011 | Knight | G06F 17/30312 707/602 |
| 2011/0169536 | A1* | 7/2011 | Friddell | G06F 1/3203 327/156 |
| 2011/0191223 | A1* | 8/2011 | Singh | G06O 30/04 705/34 |
| 2011/0219118 | A1* | 9/2011 | Cowan | G06F 11/3409 709/224 |
| 2012/0074789 | A1* | 3/2012 | Yonezawa | G01D 4/00 307/84 |

OTHER PUBLICATIONS

Altmann, J., et al., "How to Charge for Network Services—Flat-Rate or Usage-Based?", Computer Networks, vol. 36, Issue 5-6, Theme Issue on Network Economics, pp. 519-531, Aug. 2001.

Viterbo, E., et al., "Dynamic Pricing for Connection-Oriented Services in Wireless Networks," 2001 12th IEEE International Symposium on Personal, Indoor and Mobile Radio Communications, Sep. 2001, pp. A68--A72.

Schoenen, R., et al., "Economics of User-in-the-Loop Demand Control with Differentiated QoS in Cellular Networks," IEEE 23rd International Symposium on Personal Indoor and Mobile Radio Communications (PIMRC), Sep. 9-12, 2012, pp. 1131-1136.

Schoenen, R., et al., "First Survey Results of Quantified User Behavior in User-in-the-Loop Scenarios for Sustainable Wireless Networks," 2012 IEEE Vehicular Technology Conference (VTC Fall), Sep. 3-6, 2012, pp. 1-5.

Schoenen, R., et al. "Green Communications by Demand Shaping and User-in-the-Loop Tariff-Based Control," 2011 IEEE Online Conference on Green Communications (GreenCom), Sep. 26-29, 2011, pp. 64-69.

Nicosia, M., et al., "Rethinking Flat Rate Pricing for Broadband Services," Cisco, Jul. 2012, http://www.cisco.com/web/about/ac79/docs/sp/Rethinking-Flat-Rate-Pricing-for-Broadband.pdf, 15 pages.

Schoenen, R., et al., "On Increasing the Spectral Efficiency More Than 100% by User-in-the-Control-Loop," 2010 16th Asia-Pacific Conference on Communications (APCC), Oct. 31-Nov. 3, 2010, pp. 159-164.

Schoenen, R., et al., "Quantified User Behavior in User-in-the-Loop Spatially and Demand Controlled Cellular systems," 18th European Wireless Conference, Apr. 18-20, 2012, pp. 1-8.

Schoenen, R., et al., "Mobility Aware Users Substantially Boost Spectral Efficiency of Cellular OFDMA Systems," IEEE Communications Letters, Vol. 15, No. 5, May 2011, pp. 488-490.

* cited by examiner

SYSTEM AND METHOD FOR CHARGING SERVICES USING EFFECTIVE QUANTA UNITS

This application claims the benefit of U.S. Provisional Application No. 61/749,584 filed on Jan. 7, 2013 by Rainer Schoenen et al. and entitled "Effective Bits for Charging Methods and Systems," which is hereby incorporated herein by reference as if reproduced in its entirety.

TECHNICAL FIELD

The present invention relates to the field of communications systems and services, and, in particular embodiments, to a system and method for charging services using effective quanta units.

BACKGROUND

Pure flat rates for services, such as communications services (e.g., voice/video call, data, text, applications) are unsuitable for influencing user behavior, for example limiting usage. However, a flat-rate with a cap can be converted to de-facto usage-based by providing a refund for unused capacity. Usage-based pricing is typically implemented as linear billing, in other words the cost or charge is proportional to usage. In a dynamic pricing approach, the billing is done by summing up the product of prices-per-unit and volume of usage (e.g., in bits or bytes) for different constant segments, in a step-wise manner. The segments can represent different services or different levels or classes of services. This allows for dynamic prices and a linear addition of segments. However, this approach does not support other than linear billing per segment. There is a need for a scheme that supports different types of monotonic billing functions, e.g., logarithmic billing and linear billing.

SUMMARY OF THE INVENTION

In accordance with an embodiment of the disclosure, a method for dynamic charging of services to consumers comprises measuring usage of a plurality of services to a consumer, and converting the measured usage of each of the services into an amount of minimum quantum of usage. The method further comprises calculating a total charge of the services according to a total amount of minimum quantum of usage for the plurality of services.

In accordance with another embodiment of the disclosure, a method for dynamic charging of communications services to consumers comprises measuring, in bits, usage of a plurality of communications services to a consumer, and converting the measured usage in bits of each of the communications services into an amount of effective bits (eBits) of usage. The amount of eBits for each service of the communications services is proportional to the measured usage in bits and a corresponding weight defined for the service. The method further comprises calculating a total charge of the communications services according to a total amount of eBits for the plurality of communications services.

In accordance with yet another embodiment of the disclosure, an apparatus of a billing system for dynamic charging of services to consumers comprises at least one processor and a non-transitory computer readable storage medium storing programming for execution by the processor. The programming includes instructions to measure usage of a plurality of services to a consumer, and convert the measured usage of each of the services into an amount of minimum quantum of usage. The programming further includes instructions to calculate a total charge of the services according to a total amount of minimum quantum of usage for all the services.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
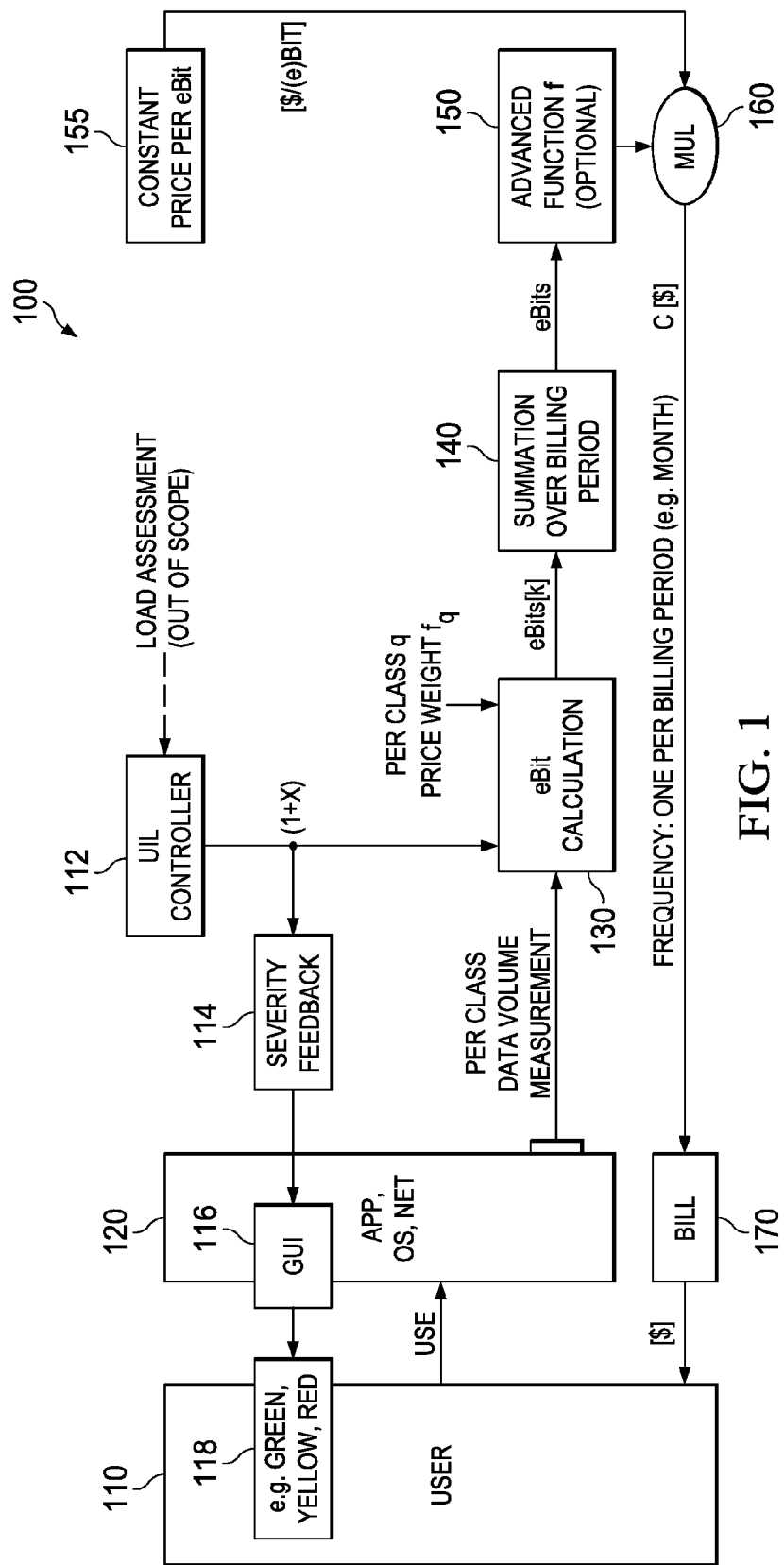
FIG. 1 illustrates an embodiment of a dynamic billing system using effective bits (eBits)

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for enabling dynamic pricing of services to users. Instead of providing users with different charging rates at different times, e.g., for different services or different segments or levels of volume of usage, the amount of all or different services used are quantized into quanta of minimum usage units, referred to herein as effective quanta bits. For instance, in the case of communications services, the amount of usage for voice minutes, texts, and data services is typically expressed in bits or bytes. The amounts of usage of these different services are all reduced to equivalent numbers of effective bits (eBits). The resulting total number of eBits can be converted into a total charge, for instance the product of the total number of eBits and a fixed charge rate per eBit. Specifically, the amount of usage of the different services in bits (or bytes) is weighted differently, e.g., according to service cost or demand, to obtain corresponding numbers of eBits for the different services. The eBits are then summed up to provide a total number of eBits for the used services.

A user can be provided with a bill that shows usage bits for each service, the corresponding eBits (due to weighting), and a total charge for all used services corresponding to the total number of eBits. This eBits charging based approach simplifies charging of different services and allow for dynamic charging. For instance, the weights applied to the amount of usage can change with service, time, consumption behavior, or other suitable factors. Thus, any monotonic billing functions can be implemented, e.g., logarithmic billing functions. This also enables providers of services to gage cost or demand by controlling weights and hence improve revenue. Since the weights are transparent to the user, this can influence user behavior in terms of consumption. This dynamic charging approach can be extended to any types of suitable services other than communications services. For example, consumable services such as different electricity services can be quantized different effective kWh units, water/gas services can be quantized in effective cubic meter ($m^3$) units, food services can be quantized in effective kg units, and transportation services can be quantized in effective km or mile units.

In an embodiment, for each quantum (of fixed price) of service usage, indexed by sequence number k, a value v[k] is defined as the real measured volume of traffic consumed (e.g., in bits for communications services) within one class of services. Additionally, p[k] is defined as the dynamic price (e.g., $/bits for communications services) to be subjected to that quantum. The 'regular' price (e.g., $/bits) without any dynamic pricing is $p_{const}$, and the price increase for the dynamic pricing is (1+X[k]). The factor x is a stretching or dilatation factor x that can be dynamically adjusted. Specifically, $p[k]=p_{const}\times(1+X[k])$ is the price rate (e.g., $/bits) for segment k. The value x is not limited to X>0, but X<0 can also be used, for example, for rebates, positive incentives, payback-for-ad-viewing. The price rate p[k] is known to the consumer (open and transparent). Traditionally, the billed amount, 'cost' C, is obtained as $C=\Sigma(p[k]\times v[k])$, where the sum is over k. To apply the dynamic approach, a sum of effective quanta units is calculated instead of the p[k]×v[k]. For instance, in case of communications services, the sum of eBits is calculated as $eBits[k]=v[k]\times(1+x[k])$. Thus, the bill amount becomes $C=p_{const}\times(\Sigma eBits[k])$.

This allows the use of any monotonic billing function f( ) for instance $C=p_{const}\times f(\Sigma eBits[k])$. For instance, linear billing is achieved with f(x)=x, where x is the consumption amount unit (e.g., in eBits). Consumption patterns of users can be distributed over substantially different orders of magnitude, such as in the case of a heavy-tailed distribution. In an exemplary communications services scenario, some users (group A users) may consume 10 Megabytes (MB)/month of data, while other users (group B users) may consume 1 Terabytes (TB)/month of data. Using linear pricing, group A users may pay zero or group B users may pay nearly infinity (out of bounds) due to the substantial difference in magnitudes of consumption between the two groups. To avoid this situation, a concave function f( ) is used to bring the orders of magnitude closer to each other. An example of a concave function is a logarithmic function f(x)=log(x), for instance in the form $f(x)=b \log_{10}(x/a)$, where b and a are suitable constants. If the bill amount is $C=\log(\Sigma(p[k]\times v[k]))$, p[k] may not make sense to the user. With eBits, the bill amount becomes $C=p_{const}\times b\times\log_{10}(\Sigma eBits[k]/a)$. As such, the user knows the constant price (per quanta unit of usage) and can get a statement of eBits on his detailed bill. This billing approach also supports "cost-brake" solutions and cap-based flat plans, because it is the effective volume $\Sigma eBits[k]$ which is counted and compared against the thresholds.

Typically, a different constant price can be set for each class of traffic. An example of pricing for communications services includes $10/Gigabyte (GB) for data, $1.67/MB for voice (at 16 kbit/s and $0.2/minute), and $1250/MB for SMS (with 160 B/SMS and $0.2/SMS). A separate tariff for video and other value-based services makes sense as it requires more stringent quality of service QoS handling (more resources). However, having individual plans for each service (voice plan, data plan, text or SMS plan) can be confusing for the consumer and is not desirable. Usage-based pricing having to count the volume separately for each class is even more confusing to the end user. Instead, using the eBit based charging described above, each class has a constant weight factor $f_q$, and the volume is counted in eBits (one-dimensional). Thus, only one price per eBit can be used, which may be different for different providers. Varying the weight factor for different services allows value-based charging, for example, $f_{data}=1$ for data services, $f_{video}=2$ for video services, and $f_{voice}=4$ for voice services. The mapping between total eBits and total actual consumption of all services can be achieved using corresponding weights as $eBits[k]=\Sigma f_q\times bits_q[k]$, which is a mapping of multiple dimensions into one dimension. Thus, a monthly bill is summed up as $C=p_{const}\times f(\Sigma eBits[k])$. The user knows the constant price per eBit and gets a statement of eBits on his detailed bill.

FIG. 1 shows an embodiment of a dynamic billing system 100 for communications services using effective bits (eBits). The task is addressed in two timescales. The first is accounting on a per-session basis (k), or by the second or minute. The second is billing at the end of the period, e.g., by month, 3 months, or year. When a user 110 (e.g., using a user device) uses or accesses a service 120 (e.g., an application, OS, or network service), data volume measurement per service class is tracked by an eBit calculation function 130. The eBit calculation function 130 calculates the total eBits for the services as described above. The eBit calculation function 130 also receives other input, such as price weight $f_q$ per class q, and possibly the price increase for the dynamic pricing 1+X from a User-in-the-loop (UIL) controller 112, for example based on load assessment. Severity of usage feedback 114 can also be sent to the user 118 via a GUI 116 for the service 120 and a corresponding interface at the user 110. The eBit calculation function 130 also sends the calculation results to a summation over billing period function 140, which sums the eBits over the billing period (e.g., on monthly basis). The summed up eBits may be sent to an advanced function 150, f, which may be a logarithmic billing function for example. Total cost can then be multiplied by a multiplier function 160 according to a defined constant price 155 per eBit. The total cost for the billing period is then presented in a bill 170 to the user 110.

Figure 2:
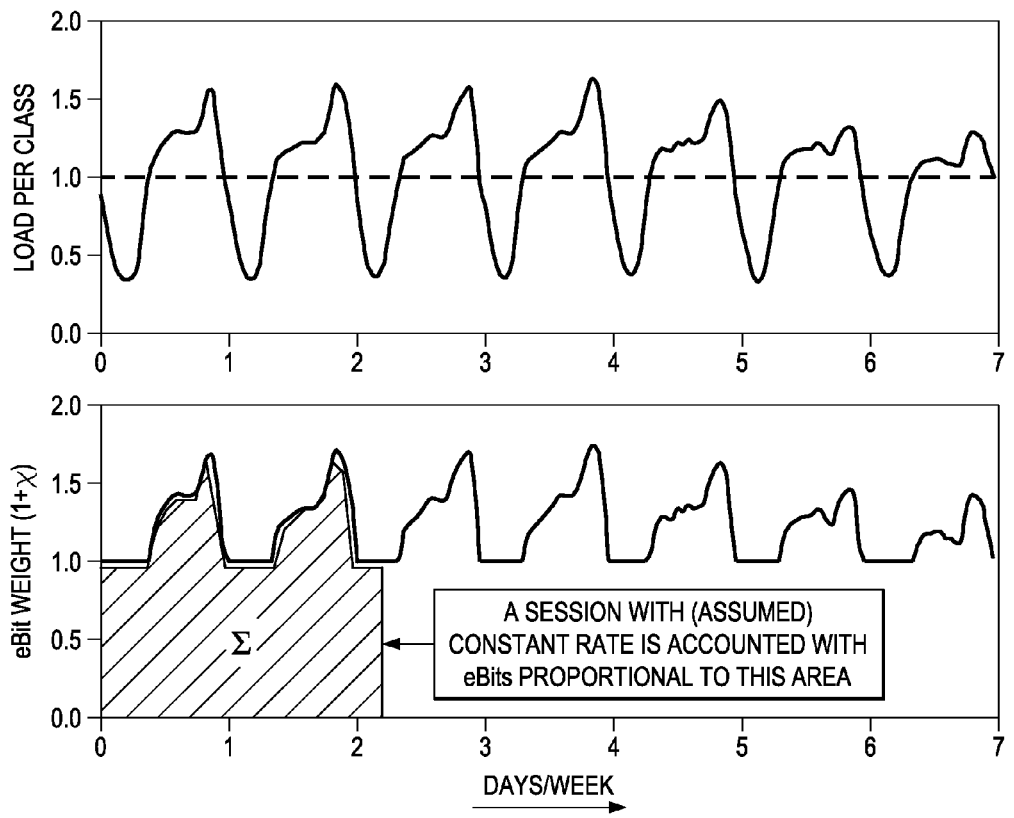
FIG. 2 illustrates an example of varying load and corresponding effective bit (eBit) weights over time according to the dynamic billing system with eBits.

FIG. 2 shows an example of varying load and corresponding eBit weights over time according to a dynamic billing system with eBits. The load situation (curved trace) compared to the capacity (dotted line) is shown. In cas of service traffic congestion, the UIL control suggests an eBit weight incentive of 1+X. Traffic over that time is scaled with this factor to obtain eBits. The ebits are summed up and multiplied with the regular price ($/bit). This constitutes the cost presented to the consumer.

Figure 3:
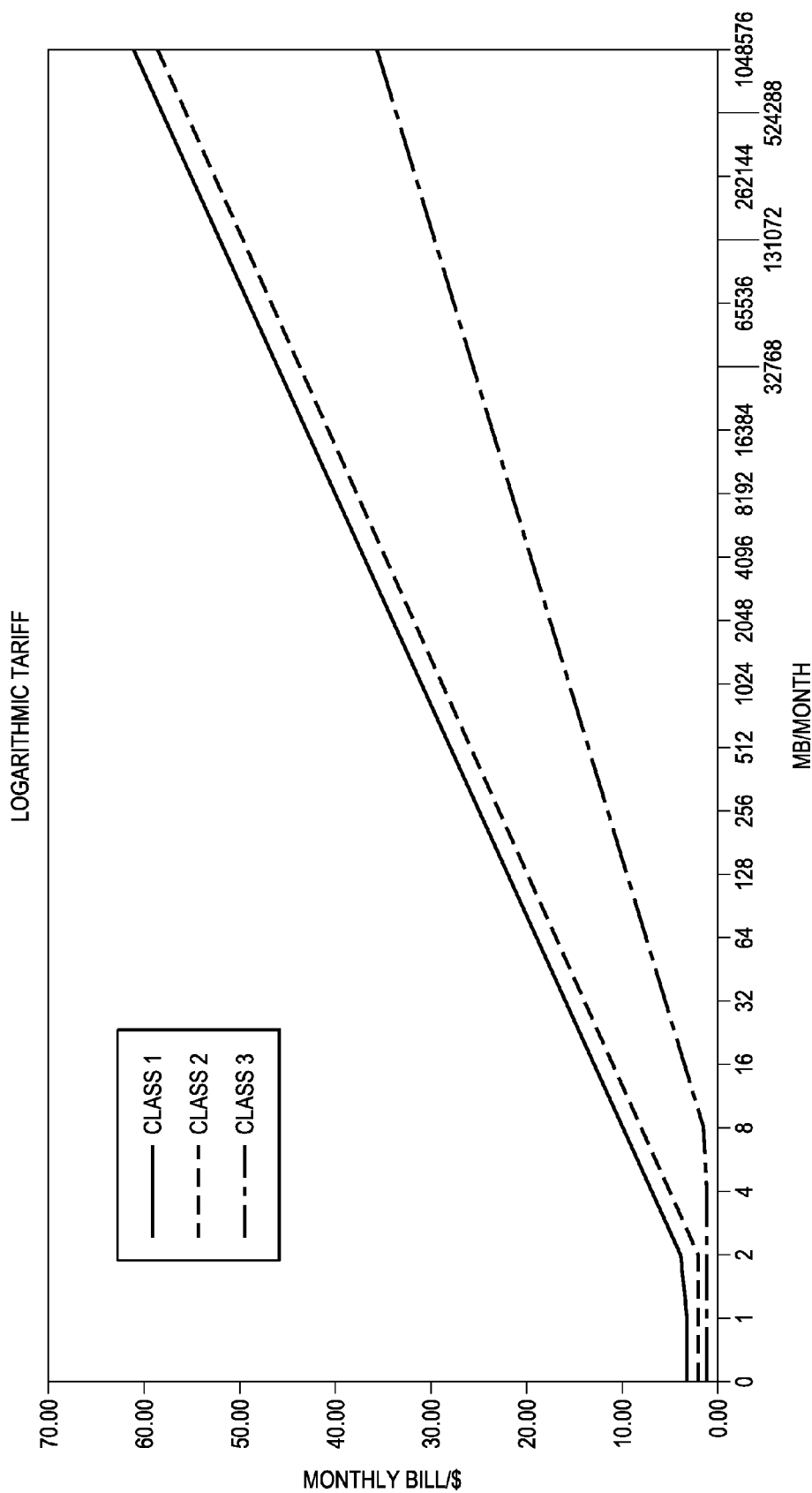
FIG. 3 is a chart illustrating an example of using logarithmic or tiered tariff billing over usage.

FIG. 3 is a chart 300 illustrating an example of using logarithmic or tiered tariff billing over usage. The logarithmic or tiered tariff billing allows dynamic pricing for user demand control (UIL) that can change over time. Since the total sum of monthly (or per other billing period) charges depends on total usage volume, a price per transaction is not fixed. Using the eBits billing approach described above, dynamic pricing can be indicated by factors (e.g., 1×, 2×, 3×, . . . ). The factors can be any real values including integers. The consumption of eBits (and not bits) is counted to calculate the sum of total charges per month or billing period. The chart 300 shows the total monthly billing in dollars versus consumption in MB for 3 classes of services.

Figure 4:
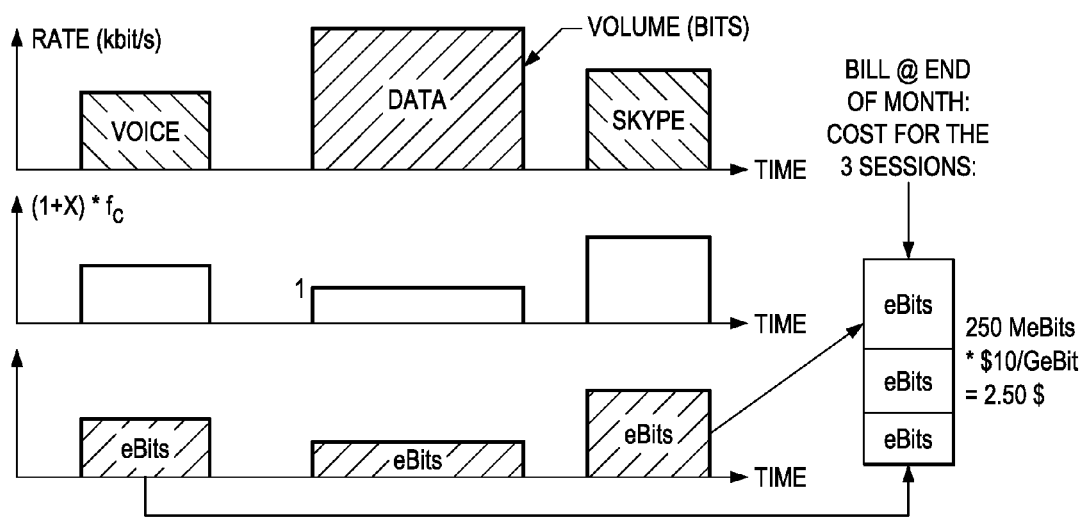
FIG. 4 illustrates an example of calculating eBits for dynamic charging of different services.

FIG. 4 illustrates an example of calculating eBits for dynamic charging of different communications services. The different services are differentiated with different price factors, e.g., $f_{data}=1$ for data, $f_{video}=2$ for video, and $f_{voice}=4$ for voice. The factors represent weights that are selected according to cost of service, demand on service, congestion of traffic service, or other suitable factors to increase revenue to providers and optimize network conditions or user experience. The factors or weights can change over time according to changes in such factors. The different services are calculated using bits and then weighted to obtain an adjusted eBit count for each service. The eBit count is then summed up and multiplied by a single fixed rate for all services.

Figure 5:
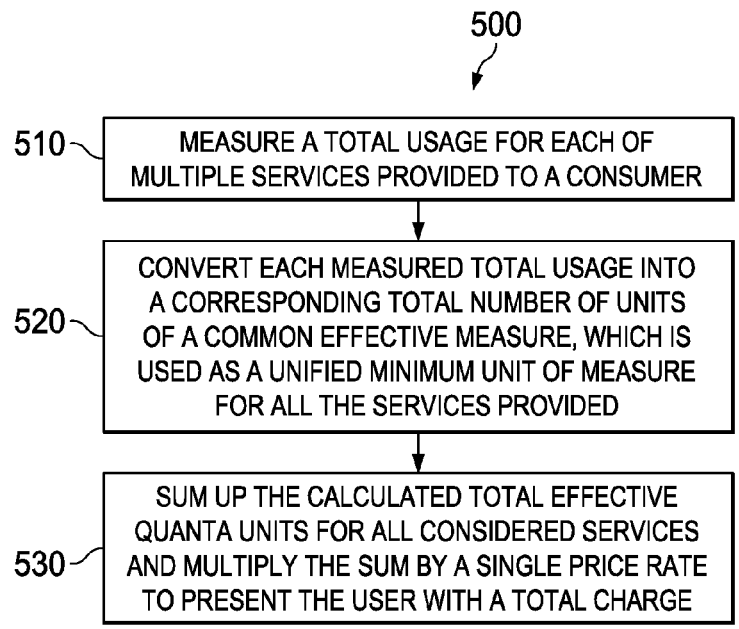
FIG. 5 illustrates an embodiment of a method for dynamic service charging using effective quanta units.

FIG. 5 shows an embodiment of a method 500 for dynamic service charging using effective quanta units. The method 500 can be applied to any consumable services provided to consumers. At step 510, total usage is measured for each of multiple services provided to a consumer. For example, in the case of various communications services to a user, a total number of consumed bits or bytes is measured for each of the services (e.g., data, voice, text or SMS, specific applications). In some scenarios the usage of different services is measured by different types of measure units (e.g., number of bytes and number of messages). At step 520, each measured total usage is converted into a corresponding total number of units of a common effective measure, which is used as a unified minimum unit (quantum) of measure for all the services provided. Specifically, the measured total usage for each service is converted into a corresponding number of effective quanta units using a corresponding weight for that service. The weights are selected based on service demand or cost, or to regulate user consumption behavior. For example, the total bits measured for each communications service is converted into an eBit by a suitable weight factor for that service. At step 530, the calculated total effective quanta units for all considered services are summed up and multiplied by a single price rate to present the user with a total charge. Optionally or alternatively, a monotonic function of the calculated total effective quanta units for all considered services (e.g., function f( ) described above) is multiplied by a single price rate to present the user with a total charge. These steps can be implemented for each billing period, for example on a monthly, quarterly, or yearly basis.

Figure 6:
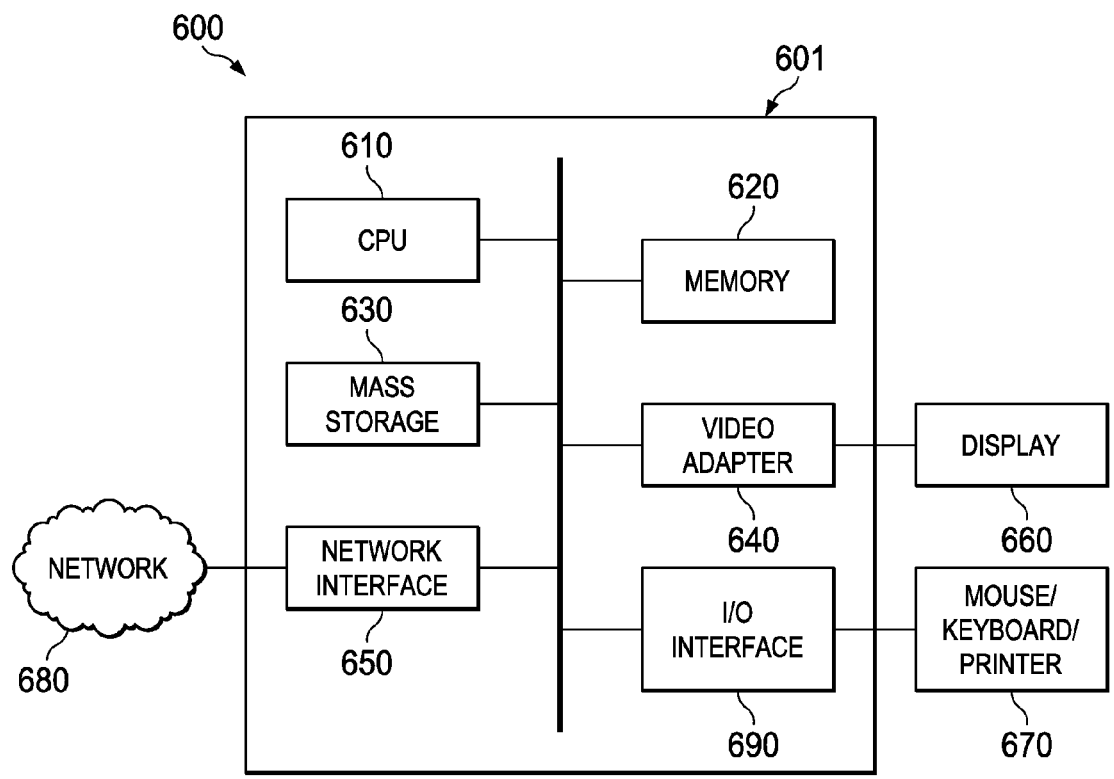
FIG. 6 is a diagram of a processing system that can be used to implement various embodiments.

FIG. 6 is a block diagram of an exemplary processing system 600 that can be used to implement various embodiments. The processing system can be part of a communications system, such as at the central office or a network component or node (e.g., a router). Alternatively, the processing system can be part of a computer based billing system, such as a billing server. In an embodiment, the processing system 600 can be part of a cloud or distributed computing environment, where the different components can be located at separate or remote components from each other and connected via one or more networks. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an Input/Output (I/O) interface 690 connected to a bus. The bus may be one or more of any type of several bus architectures including a memory bus or memory controller, a peripheral bus, a video bus, or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 690 provide interfaces to couple external input and output devices to the processing unit. As illustrated, examples of input and output devices include a display 660 coupled to the video adapter 640 and any combination of mouse/keyboard/printer 670 coupled to the I/O interface 690. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of metering network resource usage in a telecommunications network, the method comprising:

receiving, by a user device, network resource usage information from a network device, the network resource usage information specifying one or more weighting factors for one or more telecommunications services, the one or more weighting factors comprising a first weighting factor for a first telecommunications service that varies based on a network load of the telecommunications network; and adjusting, by the user device, consumption of at least one telecommunications service of the one or more telecommunications services by the user device according to the network resource usage information wherein adjusting consumption of the at least one telecommunications service by the user device according to the network resource usage information comprises estimating a change in the network load of the telecommunications network between a current period and a future period, and increasing or decreasing consumption of the at least one telecommunications service based on a function of at least one of the one or more weighting factors and the estimated change in the network load of the telecommunications network between the current period and the future period.

2. The method of claim 1, wherein the network resource usage information specifies different weighting factors for at least some of the telecommunications services.

3. The method of claim 2, wherein the network resource usage information specifies a different weighting factor for each telecommunications service having a different quality of service (QoS) requirement.

4. The method of claim 2, wherein the one or more telecommunications services comprise a voice call service, a video call service, a data service, and a message service, and wherein the network resource usage information specifies a higher weighting factor for the voice or video call service than for the data or messaging service.

5. The method of claim 1, wherein the first weighting factor for the first telecommunications service vary varies over time.

6. A user device comprising:

a processor; and a non-transitory computer readable storage medium storing programming for execution by the processor, the programming including instructions to:

receive network resource usage information from a network device in a telecommunications network, the network resource usage information specifying one or more weighting factors one or more telecommunications services, the one or more weighting factors comprising a first weighting factor for a first telecommunications service that varies based on a network load of the telecommunications network; and adjust consumption of at least one telecommunications service of the one or more telecommunications services by the user device according to the network resource usage information wherein the instructions to adjust consumption of the at least one telecommunications service by the user device according to the network resource usage information include instructions to estimate a change in the network load of the telecommunications network between a current period and a future period, and increase or decrease consumption of the at least one telecommunications service based on a function of at least one of the one or more weighting factors and the estimated change in the network load of the telecommunications network between the current period and the future period.

7. The user device of claim 6, wherein the network resource usage information specifies different weighting factors for at least some of the telecommunications services.

8. The user device of claim 7, wherein the network resource usage information specifies a different weighting factor for each telecommunications service having a different quality of service (QoS) requirement.

9. The user device of claim 7, wherein the one or more telecommunications services comprise a voice call service, a video call service, a data service, and a message service, and wherein the network resource usage information specifies a higher weighting factor for the voice or video call service than for the data or messaging service.

10. The user device of claim 6, wherein the first weighting factor for the first telecommunications service varies over time.

11. A computer program product for implementation in a user device, the computer program product comprising a non-transitory computer readable storage medium storing programming, the programming including instructions to:

receive network resource usage information from a network device in a telecommunications network, the network resource usage information specifying one or more weighting factors for one or more telecommunications services, the one or more weighting factors comprising a first weighting factor for a first telecommunications service that varies based on a network load of the telecommunications network; and adjust consumption of at least one telecommunications service of the one or more telecommunications services by the user device according to the network resource usage information wherein the instructions to adjust consumption of the at least one telecommunications service by the user device according to the network resource usage information include instructions to estimate a change in the network load of the telecommunications network between a current period and a future period, and increase or decrease consumption of the at least one telecommunications service based on a function of at least one of the one or more weighting factors and the estimated change in the network load of the telecommunications network between the current period and the future period.

12. The computer program product of claim 11, wherein the network resource usage information specifies different weighting factors for at least some of the telecommunications services.

13. The computer program product of claim 12, wherein the network resource usage information specifies a different weighting factor for each telecommunications service having a different quality of service (QoS) requirement.

14. The computer program product of claim 12, wherein the one or more telecommunications services comprise a voice call service, a video call service, a data service, and a message service, and wherein the network resource usage information specifies a higher weighting factor for the voice or video call service than for the data or messaging service.

15. The computer program product of claim 11, wherein the first weighting factor for the first telecommunications service varies over time.

16. The computer program product of claim 11, wherein the instructions to increase or decrease consumption of the at least one telecommunications service include instructions to increase consumption of the at least one telecommunications service when the estimated change indicates that the network load will decrease between the current period and the future period.

17. The computer program product of claim 11, wherein the instructions to increase or decrease consumption of the at least one telecommunications service include instructions to reduce consumption of the at least one telecommunications service when the estimated change indicates that the network load will increase between the current period and the future period.

18. The method of claim 1, wherein increasing or decreasing consumption of the at least one telecommunications service comprises increasing consumption of the at least one telecommunications service when the estimated change indicates that the network load will decrease between the current period and the future period.

19. The method of claim 1, wherein increasing or decreasing consumption of the at least one telecommunications service comprises reducing consumption of the at least one telecommunications service when the estimated change indicates that the network load will increase between the current period and the future period.

20. The user device of claim 6, wherein the instructions to increase or decrease consumption of the at least one telecommunications service include instructions to increase consumption of the at least one telecommunications service when the estimated change indicates that the network load will decrease between the current period and the future period.

21. The user device of claim 6, wherein the instructions to increase or decrease consumption of the at least one telecommunications service include instructions to reduce consumption of the at least one telecommunications service when the estimated change indicates that the network load will increase between the current period and the future period.

* * * * *

UNITED STATES PATENT AND TRADEMARK OFFICE
CERTIFICATE OF CORRECTION

PATENT NO. : 9,911,106 B2
APPLICATION NO. : 14/141143
DATED : March 6, 2018
INVENTOR(S) : Rainer Schoenen It is certified that error appears in the above-identified patent and that said Letters Patent is hereby corrected as shown below:

In the Claims

In Column 7, Line 49, Claim 5, delete "vary".

In Column 7, Line 59, Claim 6, delete "weighting factors one" and insert --weighting factors for one--.

Signed and Sealed this
Nineteenth Day of June, 2018

Andrei Iancu
*Director of the United States Patent and Trademark Office*